United States Patent [19]
Hirano

[11] Patent Number: 5,099,946
[45] Date of Patent: Mar. 31, 1992

[54] FINAL DRIVE SUSPENSION SYSTEM
[75] Inventor: Yoshinori Hirano, Yokohama, Japan
[73] Assignee: Nissan Motor Co., Ltd., Yokohama, Japan
[21] Appl. No.: 559,942
[22] Filed: Jul. 31, 1990
[30] Foreign Application Priority Data
Jul. 31, 1989 [JP]  Japan .................................. 1-199116
[51] Int. Cl.$^5$ ............................................. B60K 17/16
[52] U.S. Cl. ................................... 180/360; 180/378
[58] Field of Search ............... 180/291, 337, 351, 353, 180/354, 356, 360, 371, 374, 375, 376, 377, 378, 381, 382; 267/292

[56] References Cited
U.S. PATENT DOCUMENTS

| | | | |
|---|---|---|---|
| 4,699,230 | 10/1987 | Solleder et al. ...................... | 180/360 |
| 4,815,556 | 3/1989 | Sumimoto et al. .................. | 267/292 |
| 4,889,207 | 12/1989 | von Broock ......................... | 180/291 |

FOREIGN PATENT DOCUMENTS

| | | | |
|---|---|---|---|
| 1222808 | 8/1966 | Fed. Rep. of Germany ...... | 180/360 |
| 3637522 | 1/1988 | Fed. Rep. of Germany ...... | 180/375 |
| 31823 | 2/1988 | Japan ................................... | 180/378 |
| 305596 | 5/1955 | Switzerland ........................ | 180/360 |
| 752749 | 7/1956 | United Kingdom ................ | 180/360 |

Primary Examiner—Charles A. Marmor
Assistant Examiner—Tamara L. Finlay
Attorney, Agent, or Firm—Foley & Lardner

[57] ABSTRACT

A final drive suspension system for a motor vehicle. The final drive has a drive shaft integral with a bevel pinion meshing with a bevel wheel for turning the drive from a cardan shaft around through 90° and transmitting the drive to an axle shaft having driving wheels secured thereon. The drive shaft has an axis extending longitudinally of the vehicle and the axle shaft has an axis extending transversely of the vehicle. The final drive is subject to a rolling action due to reaction torques around the drive shaft axis and to a pitching action due to reaction torques around the axle shaft axis during vehicle running. The final drive suspension system elastically flexibly suspends the final drive at least three suspension points with respect to the vehicle. The rigidities at the respective suspension points are determined in relation to the positions of the respective suspension points to cancel the rolling and pitching actions on the drive shaft axis.

12 Claims, 3 Drawing Sheets

FINAL DRIVE SUSPENSION SYSTEM

BACKGROUND OF THE INVENTION

This invention relates to a final drive suspension system for a vehicle.

Final drives have been provided in motor vehicles for transmitting the drive from a cardan shaft to an axle shaft having driving wheels secured thereon. The final drive has a bevel pinion integral with a drive shaft coupled through a cardan joint to the cardan shaft. The bevel pinion meshes with a bevel wheel for turning the drive round through 90° and reducing the speed of the drive shaft. During vehicle driving, the final drive is subject to torques of reaction around the axis of the cardan shaft (cardan shaft moment) and also around the axis of the axle shaft (starting moment). For this reason, the final drive should be suspended elastically at the floor or the vehicle in order to reduce vibrations and noises which would be transmitted to the vehicle if it is mounted rigidity from the floor of the vehicle. However, it is impossible to nullify final drive motions merely by elastically suspending the final drive from the floor of the vehicle.

Various approaches have been proposed to reduce vibrations transmitted from the final drive to the cardan shaft. For example, U.S. Pat. No. 4,699,230 describes an axle gear casing suspension system for elastically flexibly suspending a rear axle gear casing at least two suspension points. One of the suspension points is shifted from a torque support plane determined by the other suspension point so that swivel motions of the same magnitude are produced in opposite directions at a connection point between the cardan shaft and the drive shaft. This is effective to reduce changes in the position of the connection point which is subject to the influence of the starting and cardan shaft moments.

With such a conventional suspension system, however, it is impossible to hold the drive shaft in its original position under the influence of the starting and cardan shaft moments. Particularly when a universal joint, such as a cardan joint, is used to couple the cardan joint to the drive shaft, a secondary moment, which corresponds to the joint angle between the cardan shaft and the drive shaft, will occur to produce vibrations and noises. The vibrations and noises will increase as the angle of the drive shaft with respect to the cardan shaft changes because of changes in the position of the final drive.

SUMMARY OF THE INVENTION

Therefore, it is a main object of the invention to provide an improved final drive suspension system which can minimize the change in the position of the drive shaft drivingly coupled to the cardan shaft.

There is provided, in accordance with the invention, a final drive suspension system for a vehicle comprising an axle shaft having driving wheels secured thereon, the axle shaft having an axis extending transversely of the vehicle, a cardan shaft, a final drive having a drive shaft having an axis extending longitudinally of the vehicle, the drive shaft being drivingly coupled to the cardan shaft and drivingly coupled to the axle shaft for transmitting a drive from the cardan shaft to the driving wheels, the final drive being subject to a rolling action due to reaction torques around the drive shaft axis and to a pitching action due to reaction torques around the axle shaft axis during vehicle driving, and at least three eleastic suspension means provided at respective suspending positions for elastically flexibly suspending the final drive with respect to the vehicle. The at least three suspension means have respective rigidities determined in relation to the suspending positions to cancel the rolling and pitching actions on the drive shaft axis.

In another aspect of the invention, there is provided a final drive suspension system for a vehicle comprising an axle shaft having driving wheels secured thereon, the axle shaft having an axis extending transversely of the vehicle, a cardan shaft, a final drive having a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, the bevel wheel being drivingly coupled to the axle shaft for transmitting a drive from the cardan shaft to the driving wheels, and elastic suspension means for elastically flexibly suspending the final drive at first, second and third suspension points with respect to the vehicle. The first suspension point is located in front of the axle shaft axis. The third suspension point is located behind the axle shaft axis. The second suspension point being located on one side of the drive shaft axis, whereas the third suspension point and the bevel wheel is located on the other side of the drive shaft axis. The elastic suspension means has rigidities k1, k2 and k3 at the first, second and third suspension points, respectively, the final drive having a reduction ratio of $\zeta$. The first suspension point is located a transverse distance of e1 from the second suspension point. The drive shaft axis is located a transverse distance of e2 from the second suspension point. The third suspension point is located a transverse distance of e from the second suspension point. The first suspension point is located a longitudinal distance of d from the third suspension point. The first suspension point is located a longitudinal distance of d2 from the second suspension point. The elastic suspension means has rigidities k1, k2 and k3 at the first, second and third suspension points, respectively, the rigidities k1, k2 and k3 being determined by $$\frac{k2}{k1} = \left(1 - \frac{e1}{e2}\right)\frac{-\zeta + \zeta e1/e + d/e}{\zeta + d2/e - d/e}$$

$$\frac{k2}{k3} = \left(1 - \frac{e}{e2}\right)\frac{\zeta - \zeta e1/e - d/e}{\zeta e1/e + d2/e}$$

In another aspect of the invention, there is provided a final drive suspension system for a vehicle comprising an axle shaft having driving wheels secured thereon, the axle shaft having an axis extending transversely of the vehicle, a cardan shaft, a final drive having a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, the bevel wheel being drivingly coupled to the axle shaft for transmitting a drive from the cardan shaft to the driving wheels, and elastic suspension means for elastically flexibly suspending the final drive at first, second and third suspension points with respect to the vehicle. The first suspension point is located in front of the axle shaft axis. The second and third suspension points are located behind the axle shaft axis. The first and second suspension points are located on one side of the drive shaft axis. The third suspension point and the bevel wheel are located on the other side of the drive shaft axis. The elastic suspension means has rigidities k1, k2 and k3 at the first, second and third suspension points, respectively, the rigidity k2 at the second suspension point being less than the rigidities k1 and k3 at the first and third suspension points.

In still another apsect of the invention, there is provided a final drive suspension system for a vehicle comprising an axle shaft having driving wheels secured thereon, the axle shaft having an axis extending transversely of the vehicle, a cardan shaft, a final drive having a drive shaft having an axis extending longitudinally of the vehicle, the drive shaft being drivingly coupled to the cardan shaft, a bevel pinion integral with the drive shaft, a bevel wheel provided in rear of the bevel pinion the bevel wheel meshing with the bevel pinion, the bevel wheel being drivingly coupled to the axle shaft for transmitting a drive from the cardan shaft to the driving wheels, and elastic suspension means for elastically flexibly suspending the final drive at first, second and third suspension points with respect to the vehicle. The first and second suspension points are located in front of the axle shaft axis. The third suspension point is located behind the axle shaft axis. The second suspension point is located on one side of the drive shaft axis. The first and third suspension points and the bevel wheel are located on the other side of the drive shaft axis. The elastic suspension means has rigidities k1, k2 and k3 at the first, second and third suspension points, respectively, the rigidity k1 at the first suspension point is less than the rigidities k2 and k3 at the second and third suspension points.

In still another aspect of the invention, there is provided a final gear suspension system for a vehicle comprising an axle shaft having driving wheels secured thereon, the axle shaft having an axis extending transversely of the vehicle, a cardan shaft, a final drive having a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, the bevel wheel being drivingly coupled to the axle shaft for transmitting a drive from the cardan shaft to the driving wheels, and elastic suspension means for elasticially flexibly suspending the final drive at first, second and third suspension points with respect to the vehicle. The first and second suspension points are located in front of the axle shaft axis. The third suspension point is located behind the axle shaft axis. The first and second suspension points are located on one side of the drive shaft axis. The third suspension point and the bevel wheel are located on the other side of the drive shaft axis. The first suspension point is located a transverse distance of zero from the second suspension point. The elastic suspension means has rigidities k1, k2 and k3 at the first, second and third suspension points, respectively, the rigidities k1 and k2 at the first and second suspension points being less than the rigidity k3 at the third suspension point.

BRIEF DESCRIPTION OF THE DRAWINGS

This invention will be described in greater detail by reference to the following description taken in connection with the accompanying drawings, in which.

DETAILED DESCRIPTION OF THE INVENTION

Prior to the description of the preferred embodiments of the present invention, the principles of the invention will be described in order to provide a basis for a better understanding of the invention.

Figure 1:
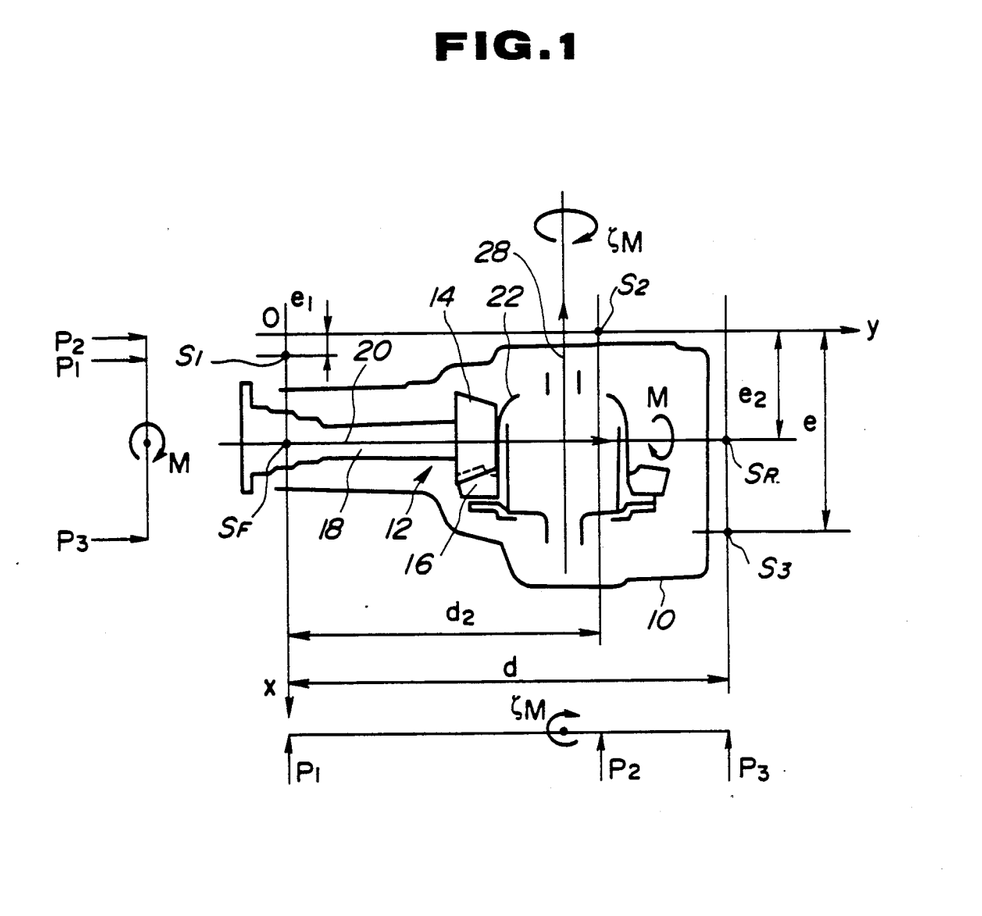
FIG. 1 is a schematic diagram used in explaining the principles of the invention.

Referring to FIG. 1, there is shown a final drive unit including an axle gear casing 10 which contains a final drive 12 and a differential 22. The final drive 12 is shown as including a bevel pinion 12 meshed with a bevel wheel 16 having a diameter greater than the diameter of the bevel pinion 14. The bevel pinion 14 is integral with a drive shaft 18 which extends outward through the front end of the axle gear casing 10 and terminates at its front end in a disc flange for connection to a cardan or propeller shaft. The drive shaft 18 has an axis 20 extending in the direction of the length of the vehicle. Two axle shafts, which extend from the axle gear casing 10 to the respective driving wheels of the vehicle, have an axis 28 extending in the direction of the width of the vehicle. From the engine the drive is transmitted through a clutch and a gear box to the cardan shaft having a universal joint at each end. It is then taken by the drive shaft 18 to the final drive 12. The final drive 12 turns the drive round through 90° and reduces the speed in a selected ratio. The differential 22 divides it equally between the two axle shafts which convey it to the driving wheels.

It is first assumed that the axle gear casing 10 is suspended elastically flexibly at the floor of the vehicle body through three elastic suspension elements located at suspension points S1, S2 and S3, as shown in FIG. 1. The first suspension point S1 is located in front of the axle shafts axis 28 and the second and third suspension points S2 and S3 are located behind the axle shaft axis 28. The first and second suspension points S1 and S2 are located on one side of the drive shaft axis 20, whereas the third suspension point S3 and the bevel wheel 16 are located on the other side of the drive shaft axis 20. In a two-dimensional orthogonal coordinate system, O-xy, with the x coordinate axis extending parallel to the axle shaft axis 28 (or to the lateral central axis of the axle gear casing 10) and through the first suspension point S1 and the y coordinate axis extending parallel to the drive shaft axis 20 (or to the longitudinal central axis of the axle gear casing 10) and through the second suspension point S2, the first suspension point S1 has the coordinates (e1, 0), the second suspension point S2 has the coordinate (0, d2), and the third suspension point S3 has the coordinates (e, d). In FIG. 1, the distance to the right of O along the x coordinate axis is the abscissa and the distance to the downward of O along the y coordinate axis is the ordinate. The drive shaft axis 20 is spaced a transverse distance e2 from the y coordinate axis.

Assuming now that M is the reaction torque created around the drive shaft axis 20 (cardan shaft moment) when the vehicle moves in the forward direction with the final drive 12 having a reduction ratio of $\zeta$, the reaction torque produced around the axle shaft axis 28 (starting moment) is $\zeta M$. The reaction forces P1, P2 and P3 produced at the respective suspension points S1, S2 and S3 are obtained as follows:

The sum of the moments around the y coordinate axis is zero.

$$M - e1\, P1 - e\, P3 = 0 \tag{1}$$

The sum of the moments around the axis extending parallel to the x coordinate axis and through the third suspension point S3 is zero.

$$d\, P1 + \zeta M + (d - d2) P2 = 0 \tag{2}$$

It is to be noted that the mass of the final drive unit may be ignored since the cardan shaft moment M and the starting moment $\zeta M$ are much greater than the torque produced in relation to the mass of the final drive. The sum of the supporting reaction forces P1, P2 and P3 acting at the first, second and third suspension points S1, S2 and S3, respectively, is zero.

$$P1 + P2 + P3 = 0 \tag{3}$$

Solving Equations (1), (2) and (3) for the supporting reaction forces P1, P2 and P3 yields $$P1 = -\frac{\zeta e - (d - d2)}{e1\, d + (e - e1) d2} M \tag{4}$$

$$P2 = \frac{\zeta(e - e1) - d}{e1\, d + (e - e1) d2} M \tag{5}$$

$$P3 = \frac{\zeta e1 + d2}{e1\, d + (e - e1) d2} M \tag{6}$$

The displacements z1, z2 and z3 of the respective suspension points S1, S2 and S3 in the z-direction perpendicular to the x and y coordinate axes are given as $$z1 = \frac{P1}{k1} \tag{7}$$

$$z2 = \frac{P2}{k2} \tag{8}$$

$$z3 = \frac{P3}{k3} \tag{9}$$

where k1, k2 and k3 are the rigidities of the suspension elements located at the first, second and third suspension points S1, S2 and S3, respectively.

In the three-dimensional orthogonal coordinate system, O-xyz, with the z coordinate axis extending normal to the x and y coordinate axes and through the origin 0, the first, second and third suspension points S1, S2 and S3 are expressed as S1(e1, 0, z1), S2(0, d2, z2) and S3(e, d, z3). Therefore, the plane in which the suspension points S1, S2 and S2 lie is given by $$
\begin{aligned}
z &= [1/\{e\, d2 + e1\, (d - d2)\}] \times \\
&\quad [\{d(z1 - z2) + d2(z3 - z1)\}x + \\
&\quad \{e1(z3 - z2) - e(z1 - z2)\}y + \\
&\quad e\, d2\, z1 + e1\, d\, z2 - e1\, d2\, z3] \\
&= [1/\{e\, d2 + e1\, (d - d2)\}] \times \\
&\quad [\{(d - d2) z1 - d\, z2 + d2\, z3\}x + \\
&\quad \{-e\, z1 + (e - e1) z2 + e1\, z3\}y + \\
&\quad e\, d2\, z1 + e1\, d\, z2 - e1\, d2\, z3]
\end{aligned}
\tag{10}
$$

If no displacement occurs in the z-direction at two given points lying in the axis 20 of the drive shaft 18, it means that the drive shaft 18 is held in its original position. In other words, if two given points SF (e2, 0, 0) and SR (e2, d, 0) satisfy Equation (10) regardless of the z-direction displacements z1, z2 and z3, it means that no change occurs in the angle between the drive shaft 18 and the cardan shaft 32. Substituting the points SF and SR and Equations (7), (8) and (9) into Equation (10) yields the following equations $$
\left\{ (d - d2)\frac{P1}{k1} - d\frac{P2}{k2} + d2\frac{P3}{k3} \right\} e2 + \\
e\, d2\frac{P1}{k1} + e1\, d\frac{P2}{k2} - e1\, d2\frac{P3}{k3} = 0
\tag{11}
$$

$$
\left\{ (d - d2)\frac{P1}{k1} - d\frac{P2}{k2} + d2\frac{P3}{k3} \right\} e2 + \\
\left\{ -e\frac{P1}{k1} + (e - e1)\frac{P2}{k2} + e1\frac{P3}{k3} \right\} d + \\
e\, d2\frac{P1}{k1} + e1\, d\frac{P2}{k2} - e1\, d2\frac{P3}{k3} = 0
\tag{12}
$$

Equations (11) and (12) can be modified as $$
\{e2\, d + (e - e2) d2\}\frac{P1}{k1} - (e2 - e1) d\frac{P2}{k2} + \\
(e2 - e1) d2\frac{P3}{k3} = 0
\tag{13}
$$

$$
-(e - e2)(d - d2)\frac{P1}{k1} + (e - e2) d\frac{P2}{k2} + \\
\{e1\, d + (e2 - e1) d2\}\frac{P3}{k3} = 0
\tag{14}
$$

Equations (13) and (14) can be modified to forms including ratios of k1, k2 and k3.

$$
\{e2\, d + (e - e2) d2\} P1 \frac{k2}{k1} + \\
(e2 - e1) d2\, P3 \frac{k2}{k3} - (e2 - e1) d\, P2 = 0
\tag{15}
$$

$$
-(e - e2)(d - d2) P1 \frac{k2}{k1} + \\
\{e1\, d + (e2 - e1) d2\} P3 \frac{k2}{k3} + (e - e2) d\, P2 = 0
\tag{16}
$$

Solving Equations (15) and (16) for k2/k1 and k2/k3, respectively, yields $$\frac{k2}{k1} = \frac{BF - CE}{AE - BD} \quad (17)$$

$$\frac{k2}{k3} = \frac{CD - AF}{AE - BD} \quad (18)$$

where
$A = \{e2d + (e - e2)d2\}P1$ $B = (e2 - e1)d2 P3$ $C = -(e2 - e1)d P2$ $D = -(e - e2)(d - d2)P1$ $E = \{e1d + (e2 - e1)d2\}P3$ $F = (e - e2)d P2$ Rearrangement gives the following equations $$\frac{k2}{k1} = \frac{e2 - e1}{e2} \cdot \frac{P2}{P1} \quad (19)$$

$$= \left(1 - \frac{e1}{e2}\right) \frac{-\zeta + \zeta e1/e + d/e}{\zeta + d2/e - d/e},$$

$$\frac{k2}{k3} = \frac{e2 - e}{e2} \cdot \frac{P2}{P3} \quad (20)$$

$$= \left(1 - \frac{e}{e2}\right) \frac{\zeta - \zeta e1/e - d/e}{\zeta e1/e + d2/e}$$

It is, therefore, possible to hold the drive shaft 18 in its original position regardless of changes of the position of the final drive unit by selecting the positions (determined by e, e1, e2, d, d2) and the rigidities k1, k2 and k3 of the respective suspension points S1, S2 and S3 in a manner to satisfy Equations (19) and (20).

Considerations are made to the conditions for which Equation (19) holds. Since the left side (k2/k1) of Equation (19) is positive, the right side of Equation (19) should be positive. Thus, Equation (19) may be considered to hold for the following four cases of conditions:

Case (I)  $1 - e1/e2 > 0$,
$-\zeta + \zeta e1/e + d/e > 0$, and
$\zeta + d2/e - d/e > 0$ or $$\frac{e1}{e2} < 1 \text{ and } \zeta\left(1 - \frac{e1}{e}\right) < \frac{d}{e} < \zeta + \frac{d2}{e}$$

These conditions can be fulfilled.

Case (II)  $1 - e1/e2 > 0$,
$-\zeta + \zeta e1/e + d/e < 0$, and
$\zeta + d2/e - d/e < 0$ or $$\frac{e1}{e2} < 1 \text{ and } \left(\zeta + \frac{d2}{e}\right) < \frac{d}{e} < \left(1 - \frac{e1}{e}\right)\zeta$$

These conditions cannot be fulfilled.

Case (III)  $1 - e1/e2 < 0$
$-\zeta + \zeta e1/e + d/e < 0$
$\zeta + d2/e - d/e > 0$ or $$1 < \frac{e1}{e2} \text{ and } \frac{d}{e} < \zeta\left(1 - \frac{e1}{e}\right)$$

These conditions can be fulfilled.

Case (IV)  $1 - e1/e2 < 0$
$-\zeta + \zeta e1/e + d/e > 0$
$\zeta + d2/e - d/e < 0$ or $$1 < \frac{e1}{e2} \text{ and } \zeta + \frac{d2}{e} < \frac{d}{e}$$

These conditions can be fulfilled.

Considerations are made to the conditions for which Equation (20) holds. Since the left side (k2/k1) of Equation (20) is positive, the right side of Equation (20) should be positive. Thus, Equation (20) may be considered to hold for the following two cases of conditions since $\zeta e1/e + d2/e$ are always positive except when the first and second suspension points S1 and S2 are located at the origin O (when e1=0 and d2=0).

Case (V)  $1 - e/e2 > 0$, and
$\zeta - \zeta e1/e - d/e > 0$ or $$\frac{e}{e2} < 1 \text{ and } \frac{d}{e} < \zeta\left(1 - \frac{e1}{e}\right)$$

Case (VI)  $1 - e/e2 < 0$
$\zeta - \zeta e1/e - d/e < 0$ or $$1 < \frac{e}{e2} \text{ and } \zeta\left(1 - \frac{e1}{e}\right) < \frac{d}{e}$$

If the conditions of the selected one of the first, third and fourth cases (I), (III) and (IV) are not contradictory to the conditions of selected one of the fifth and sixth cases (V) and (VI), both of Equations (19) and (20) will hold for the combination of the conditions of the selected cases. We have thus found two combinations, the first combination being the combination of the conditions of the first case (I) and the conditions of the sixth case (VI). The second combination is the combination of the conditions of the fourth case (IV) and the conditions of the sixth case (VI). The conditions of the first combination are given as $$e1 < e2 < e \text{ and } \zeta\left(1 - \frac{e1}{e}\right) < \frac{d}{e} < \zeta + \frac{d2}{e}$$

If these conditions for which both of Equations (19) and (20) hold are fulfilled, the rolling motion which would be produced on the final drive unit due to the cardan shaft moment around the drive shaft axis 20 and the pitching motion which would be produced on the final drive unit due to the starting moment around the axle shaft axis 28 will be canceled with each other on the drive shaft axis 20 so that the drive shaft 18 can be held in its original position. Because of this, no bending force acts on the joint between the drive shaft 18 and the cardan shaft 32 and thus no vibrations and noises occur at the joint between the drive shaft 18 and the cardan shaft 32.

These conditions of the first combination can be fulfilled, for example, when $\zeta=4$, $e1/e=\frac{1}{4}$, $e2/e=\frac{1}{2}$, $e1/e2=\frac{1}{2}$, $d/e=5$ and $d2=d$. In this case, $k1:k2:k3=4:1:3$, as can be derived from Equations (19) and (20).

The conditions of the first combination can also be fulfilled when $\zeta=4$, $e1=\circ$, $e2/e=\frac{1}{2}$, $d/e=5$, and $d2=d$. In this case, $k1:k2:k3=4:1:5$, as can be derived from Equations (19) and (20).

From the above two examples, the following set of conditions can be derived:

$$e1 < < e (\text{or } e1=0), \text{ and } d2=d$$

These conditions are fulfilled when the first suspension point S1 is located in front of the axle shaft axis 28, whereas the second and third suspension points S2 and S3 are located behind the axle shaft axis 28, and when the first and second suspension points S1 and S2 are located on one side of the drive shaft axis 20, whereas the third suspension point S3 and the bevel wheel 16 are located on the other side of drive shaft axis 20. In this case, the rigidity at the second suspension point S2 should be smaller than the rigidities at the first and second suspension points S1 and S3 to hold the drive shaft 18 substantially in its original position regardless of changes in the position of the final drive unit or the axle gear casing 10. It is to be understood that such a desirable effect can be achieved as long as the conditions to be set for the positions of the first, second and third suspension points S1, S2 and S3 and the rigidities at the first, second and third suspension points S1, S2 and S3 are close to the conditions for which Equations (19) and (20) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (19) and (20) hold so that the movement of the drive shaft 18 with respect to the cardan shaft 32 can be reduced further.

An additional suspension point may be provided along with the first, second and third suspension points S1, S2 and S3 to suspend the final drive unit. In this case, the rigidity at the additional suspension point should be smaller than the rigidities at the first, second and third suspension points S1, S2 and S3 to bring the set conditions closer to the conditions for which Equations (19) and (20) hold and thus to further reduce the change in the angle between the drive shaft 18 and the cardan shaft 32.

The conditions of the first combination can also be fulfilled when $\zeta=4$, $e1=0$, $e2/e=\frac{1}{2}$, $d2/e=\frac{2}{3}$, and $d/e=13/3$. In this case, $k1:k2:k3=1:1:2$, as can be derived from Equation (19) and (20).

From this example, the following set of conditions can be derived:

$$e1=0, \text{ and } d2<<d$$

These conditions are fulfilled when the first and second suspension points S1 and S2 are located in front of the axle shaft axis 28, whereas the third suspension point S3 is located behind the axle shaft axis 28, and when the first and second suspension points S1 and S2 are located on one side of the drive shaft axis 20, whereas the third suspension point S3 and the bevel wheel 16 are located on the other side of the drive shaft axis 20, and when the transverse distance between the first and second suspension points S1 and S2 is zero. In this case, the rigidities at the first and second suspension points S1 and S2 should be smaller than the rigidity at the third suspension point S3 to hold the drive shaft 18 substantially in its original position regardless of changes in the position of the final drive unit. It is to be understood that such a desirable effect can be achieved as long as the conditions to be set for the positions of the first second and third suspension points S1, S2 and S3 and the rigidities at the first, second and third suspension points S1, S2 and S3 are close to the conditions for which Equations (19) and (20) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (19) and (20) hold so that the movement of the drive shaft 18 with respect to the cardan shaft 32 can be reduced further.

An additional suspension point may be provided along with the first, second and third suspension points S1, S2 and S3 to suspend the final drive unit. In this case, the rigidity at the additional suspension point should be smaller than the rigidities at the first, second and third suspension points S1, S2 and S3 to bring the set conditions closer to the conditions for which Equations (19) and (20) hold and thus to further reduce the movement of the drive shaft 18 with respect to the cardan shaft 32.

The conditions of the second combination are given as $$e2 < e1, e \text{ and } \zeta + \frac{d2}{e} < \frac{d}{e}$$

If these conditions for which both of Equations (19) and (20) hold are fulfilled, the rolling motion which would be produced on the final drive unit due to the cardan shaft torque around the drive shaft axis 20 and the pitching motion which would be produced on the final drive unit due to the starting torque around the axle shaft axis 28 will be canceled with each other on the axis 20 of the drive shaft 18 so that the drive shaft 18 can be held in alignment with the cardan shaft 32. Because of this, no bending force acts on the joint between the drive shaft 18 and the cardan shaft 32 and thus no vibrations and noises occur at the joint between the drive shaft 18 and the cardan shaft 32.

These conditions of the second combination can be fulfilled, for example, when $\zeta=4$, e1/e=1, e2/e=½, e1/e2=2, d2/e=⅓ and d/e=5. In this case, k1:k2:k3=2:15:13, as can be derived from Equations (19) and (20).

The conditions of the second combination can also be fulfilled when $\zeta=4$, d2=0, e1/e=1, e2/e=½, e1/e2=2 and d/e=5. In this case, k1:k2:k3=1:5:4, as can be derived from Equations (19) and (20).

From the above two examples, the following set of conditions can be derived:

$$e1 = e \text{ and } d2 < < d \text{ (or } d2=0)$$

These conditions are fulfilled when the first and second suspension points S1 and S2 are located in front of the axle shaft axis 28, whereas the third suspension point S3 is located behind the axle shaft axis 28, and when the first and third suspension points S1 and S3 are located on one side of the drive shaft axis 20, whereas the second suspension point S2 and the bevel wheel 16 are located on the other side of the drive shaft axis 20. In this case, the rigidity at the first suspension point S1 should be smaller than the rigidities at the second and third suspension points S2 and S3 to hold the drive shaft 18 substantially in its original position regardless of changes in the position of the final drive. It is to be understood that such a desirable effect can be achieved as long as the conditions to be set for the positions of the first, second and third suspension points S1, S2 and S3 and the rigidities at the first, second and third suspension points S1, S2 and S3 are close to the conditions for which Equations (19) and (20) hold.

If the first, second and third suspension points S1, S2 and S3 are located in a common plane including the axis 20 of the drive shaft 18, the conditions set for the positions of the first, second and third suspension points S1, S2 and S3 become closer to the conditions for which Equations (19) and (20) hold so that the movement of the drive shaft 18 with respect to the cardan shaft 32 can be reduced further.

An additional suspension point may be provided along with the first, second and third suspension points S1, S2 and S3 to suspend the final gear unit. In this case, the rigidity at the additional suspension point should be smaller than the rigidities at the first, second and third suspension points S1, S2 and S3 to bring the set conditions closer to the conditions for which Equations (19) and (20) hold and thus to further reduce the movement of the drive shaft 18 with respect to the cardan shaft 32.

Figure 2:
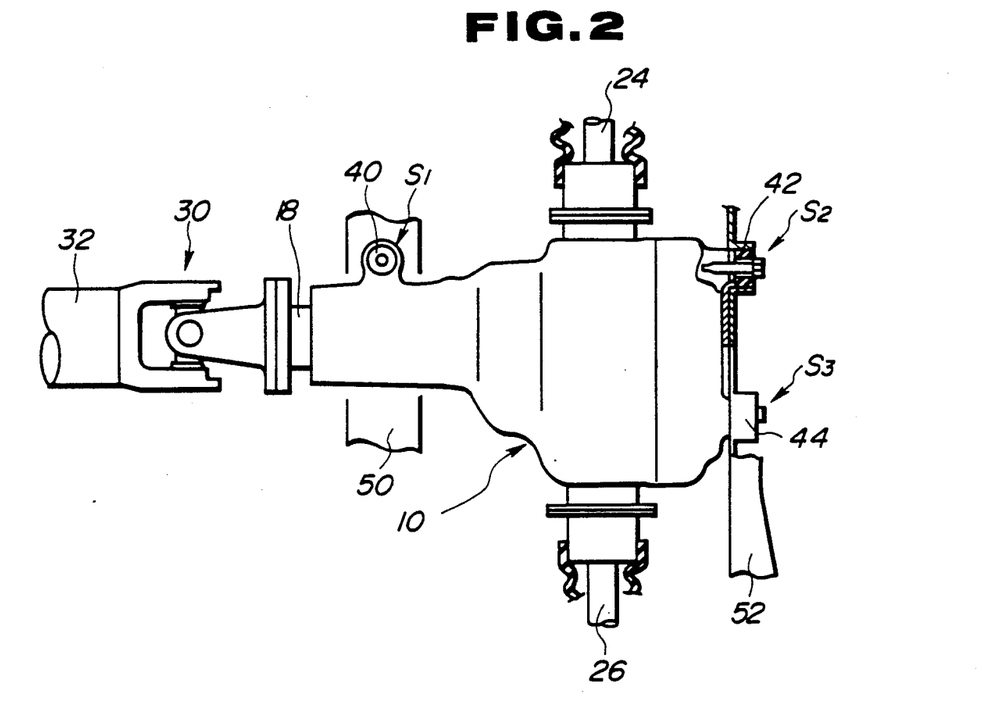
FIG. 2 is a plan view in section showing one embodiment of a final drive suspension system made in accordance with the principles of the invention.
Figure 3:
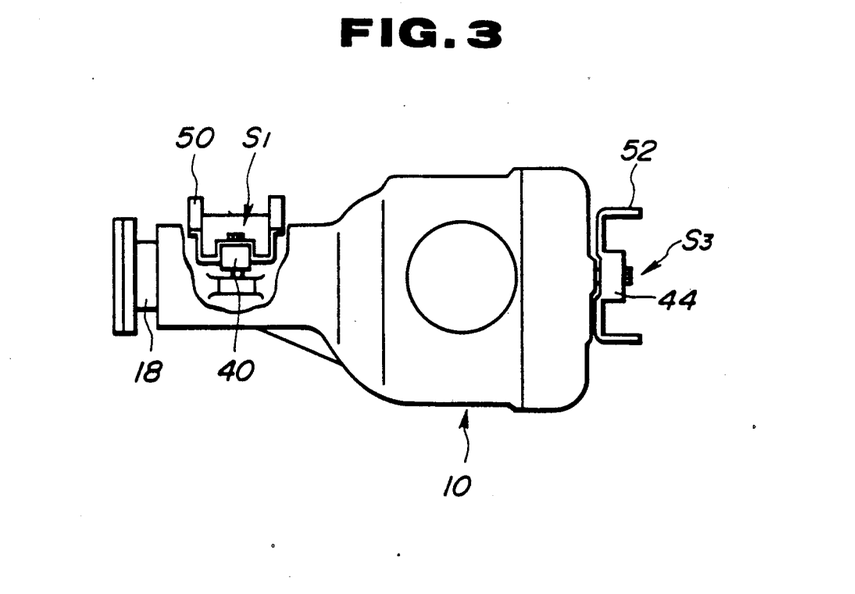
FIG. 3 is a side view in section of the final drive suspension system of FIG. 2.

Referring to FIGS. 2 and 3, there is shown one embodiment of a final drive suspension system made in accordance with the principles of the invention. Like reference numerals have been applied to FIGS. 2 and 3 with respect to the like parts shown in FIG. 1.

The axle gear casing 10 contains the same parts as described in connection with FIG. 1. The drive shaft 18 is coupled through a cardan joint 30 to the cardan shaft 32. Two axle shafts 24 and 26 extends from the axle gear casing 10 to the respective driving wheels (not shown) of the vehicle. From the engine the drive is transmitted through a clutch (not shown) and a gear box (not shown) to the cardan shaft 32 and hence through the drive shaft 18 to the final drive. The final drive 12, which has a bevel pinion 14 meshed with a bevel wheel 16 having a diameter greater than the diameter of the bevel pinion 14, as shown in FIG. 1, turns the drive round through 90° and reduce the speed in a selected ratio. The differential 22 (FIG. 1) divides it equally between the two axle shafts 24 and 26 which convey it to the driving wheels.

The axle gear casing 10 is elastically flexibly suspended from the floor of the vehicle by means of first, second and third elastic suspension elements 40, 42 and 44 located at the respective suspension points S1, S2 and S3. The first, second and third elastic suspension element 40, 42 and 44 may be of the type having an elastic bush made of an elastic material, such as rubber. The first elastic suspension element 40 is secured on a carrier member 50 mounted at the floor of the vehicle to elastically flexibly suspend the axle gear casing 10 at the first suspension point S1. The second and third elastic suspension elements 42 and 44 are secured on another carrier member 52 mounted at the floor of the vehicle to elastically flexibly suspend the axle gear casing 10 at the second and third suspension points S2 and S3. The rigidity at each of the first, second and third suspension points S1, S2 and S3 may be adjusted by adjusting the shape and/or size of the elastic bush, by varying the carbon content of the elastic bush to adjust its hardness, or by adjusting the conditions under which the elastic bush is vulcanized.

Figure 4:
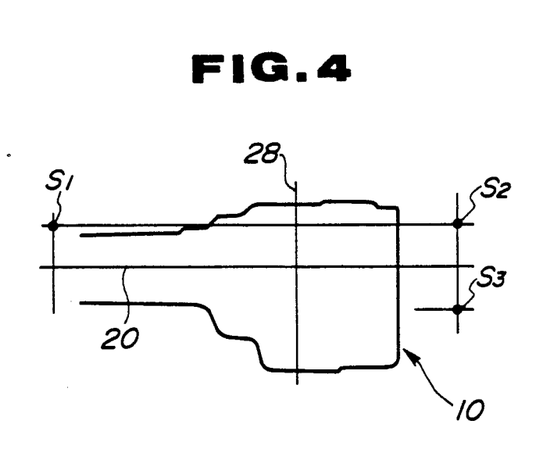
FIG. 4 is a schematic diagram used in explaining the positions of the first, second and third suspension points of the final drive suspension system of FIG. 2.

In this embodiment, the locations of the first, second and third suspension points S1, S2 and S3 are selected, as shown in FIG. 4, to fulfill the conditions of e1=0 and d2=0 which satisfy both of the first case (I) of conditions and the sixth case (VI) of conditions. That is, the first suspension point S1 is located in front of the axis 28 of the axle shafts 24 and 26. The second suspension point S2 is located behind the axle shaft axis 28. The third suspension point S3 is located behind the axle shaft axis 28. The first and second suspension points S1 and S2 are located on one side of the drive shaft axis 20, whereas the third suspension point S3 and the bevel wheel 16 are located on the other side of the drive shaft axis 20.

Substitution of e1=0 and d2=0 into Equations (19) and (20) gives the following equations for the ratios of the rigidities k1, k2 and k3 at the respective suspension points S1, S2 and S3.

$$\frac{k2}{k1} = \frac{1}{\zeta} \cdot \frac{1}{e/d} - 1 \qquad (21)$$

$$\frac{k2}{k3} = \frac{1}{e2/e} \left(1 - \frac{e}{d}\zeta\right)\left(1 - \frac{e2}{e}\right) \qquad (22)$$

If the transverse distance e of the third suspension point S3 from the y coordinate axis, the transverse distance e2 of the drive shaft axis 20 from the y coordinate axis, the longitudinal distance d of the second and third suspension points S2 and S3 from the x coordinate axis, and the rigidities k1, k2 and k3 of the respective suspension points S1, S2 and S3 are selected to satisfy Equations (21) and (22), the rolling motion of the final drive unit caused by the cardan shaft moment (M) around the drive shaft axis 20 and the pitching motion of the final drive unit caused by the starting moment ($\zeta$M) around the axle shaft axis 28 will be canceled on the drive shaft axis 20. Because of this, the drive shaft 18 is held in its horizontal position and no change occurs in the angle between the drive shaft 18 and the cardan shaft 32. This minimizes the vibrations and noises which may occur at the cardan joint 30. In this case, Equations (21) and (22) hold, for example, when $e2/e = \frac{1}{2}$ and $d/e = 5$ and $k1:k2:k3 = 4:1:5$.

When the $e1 \geqq 0$, the distances e, e1, e2, d and d2 and the rigidities k1, k2 and k3 may be selected to fulfill the conditions of $e1/e = \frac{1}{4}$, $e2/e = \frac{1}{2}$, $e1/e2 = \frac{1}{2}$, $d/e = 5$, $d2 = d$, and $k1:k2:k3: = 4:1:3$. It is to be noted that Equations (21) and (22) hold when $e1 < 0$.

Equations (21) and (22) hold approximately and substantially no change occurs in the angle of the drive shaft 18 with respect to the cardan shaft 32 as long as the rigidity k2 at the second suspension point S2 is smaller than the rigidities k1 and k3 at the first and third suspension points S1 and S3 when the first suspension point S1 is located in front of the axis 28 of the axle shafts 24 and 26, when the second suspension point S2 is located in the behind the axle shaft axis 28, when the third suspension point S3 is located behind the axle shaft axis 28, and when the first and second suspension points S1 and S2 are located on one side of the drive shaft axis 20 and the third suspension point S3 and the bevel wheel 16 are located on the other side of the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (21) and (22) hold so as to further reduce the change in the angle of the drive shaft 18 with respect to the cardan shaft 32. It is to be noted, however, that the change in the angle of the drive shaft 18 with respect to the cardan shaft 32 is much smaller than in the conventional suspension structures even though the suspension points S1, S2 and S3 do not lie in a common plane containing the drive shaft axis 20 as long as Equations (21) and (22) hold approximately.

An additional suspension point may be provided along with the first, second and third suspension points S1, S2 and S3 to suspend the axle gear casing 10. In this case, Equations (21) and (22) hold approximately when the rigidity at the additional suspension point is smaller than the rigidities k1, k2 and k3 of the respective suspension points S1, S2 and S3.

Figure 5:
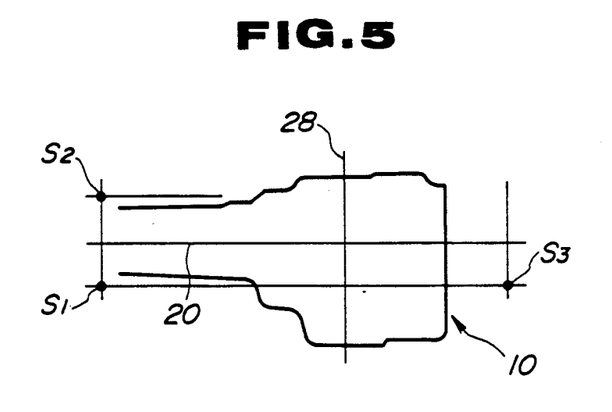
FIG. 5 is a schematic diagram used in explaining alternative positions of the first, second and third suspension points.

Alternatively, the locations of the first, second and third suspension points S1, S2 and S3 are selected, as shown in FIG. 5, to fulfill the conditions of $e1 = e$ and $d2 = 0$ which satisfy both of the fourth case (IV) of conditions and the sixth case (VI) of conditions. That is, the first suspension point S1 is located in front of the axis 28 of the axle shafts 24 and 26. The second suspension point S2 is located in front of the axle shaft axis 28. The third suspension point S3 is located behind the axle shaft axis 28. The second suspension point S2 is located on one side of the axis 20 of the drive shaft 18, whereas the first and third suspension points S1 and S3 and the bevel wheel 16 are located on the other side of the drive shaft axis 20.

Substitution of $e1 = e$ and $d2 = 0$ into Equations (19) and (20) gives the following equations for the ratios of the rigidities k1, k2 and k3 at the respective suspension points S1, S2 and S3.

$$\frac{k2}{k1} = \left(1 - \frac{e}{e2}\right)\frac{d}{\zeta e - d} \quad (23)$$

$$\frac{k2}{k3} = \left(1 - \frac{e}{e2}\right)\frac{-d}{\zeta e} \quad (24)$$

If the transverse distance e of the third suspension point S3 from the y coordinate axis, the transverse distance e2 of the drive shaft axis 20 from the y coordinate axis, the longitudinal distance d of the second and third suspension points S2 and S3 from the x coordinate axis, and the rigidities k1, k2 and k3 of the respective suspension points S1, S2 and S3 are selected to satisfy Equations (23) and (24), the rolling motion of the final drive unit caused by the cardan shaft moment (M) around the drive shaft axis 20 and the pitching motion of the final drive unit caused by the starting moment $(\zeta M)$ around the axle shaft axis 28 will be canceled on the drive shaft axis 20. Because of this, the drive shaft 18 is held in its horizontal position and no change occurs in the angle between the drive shaft 18 and the cardan shaft 32. This minimizes the vibrations and noises which may occur at the cardan joint 30. In this case, Equations (23) and (24) hold, for example, when $e1/e = 1$, $e2/e = \frac{1}{2}$, $e1/e2 = 2$, $d/e = 5$ and $k1:k2:k3 = 1:5:5$.

When $d2 > 0$, the distances e, e1, e2, d and d2 and the rigidities k1, k2 and k3 may be selected to fulfill the conditions of $e1/e = 1$, $e2/e = \frac{1}{2}$, $e1/e2 = \frac{1}{2}$, $d2/e = \frac{1}{2}$, $d/e = 5$, and $k1:k2:k3: = 2:15:13$.

Equations (23) and (24) hold approximately and substantially no change occurs in the angle of the drive shaft 18 with respect to the cardan shaft 32 as long as the rigidity k1 at the first suspension point S1 is smaller than the rigidities k2 and k3 at the second and third suspension points S2 and S3, when the first suspension point S1 is located in front of the axis 28 of the axle shafts 24 and 26, when the second suspension point S2 is located in front of the axle shaft axis 28, when the third suspension point S3 is located behind the axle shaft axis 28, and when the second suspension point S2 is located on one side of the drive shaft axis 20, whereas the first and third suspension points S1 and S3 and the bevel wheel 16 are located on the other side of the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (23) and (24) hold so as to further reduce the change in the angle of the drive shaft 18 with respect to the cardan shaft 32. It is to be noted, however, that the change in the angle of the drive shaft 18 with respect to the cardan shaft 32 is much smaller than in the conventional suspension structures even though the suspension points S1, S2 and S3 do not lie in a common plane containing the drive shaft axis 20 as long as Equations (23) and (24) hold approximately.

An additional suspension point may be provided along with the first, second and third suspension points S1, S2 and S3 to suspend the axle gear casing 10. In this case, Equations (23) and (24) hold approximately when the rigidity at the additional suspension point is smaller than the rigidities k1, k2 and k3 of the respective suspension points S1, S2 and S3.

Figure 6:
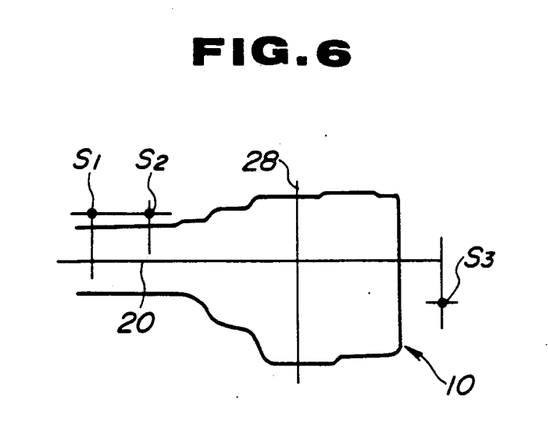
FIG. 6 is a schematic diagram used explaining alternative positions of the first, second and third suspension points.

Alternatively, the locations of the first, second and third suspension points S1, S2 and S3 are selected, as shown in FIG. 6, to fulfill the condition of $e1 = 0$ which satisfies both of the first case (I) of conditions and the sixth case (VI) of conditions. That is, the first suspension point S1 is located in front of the axis 28 of the axle shafts 24 and 26. The second suspension point S2 is located in front of the axle shaft axis 28. The third suspension point S3 is located behind the axle shaft axis 28. The first and second suspension points S1 and S2 are located on one side of the drive shaft axis 20 and the third suspension point S3 and the bevel wheel 16 are located on the other side of the drive shaft axis 20.

Substitution of e1=0 into Equations (19) and (20) gives the following equations for the ratios of the rigidities k1, k2 and k3 at the respective suspension points S1, S2 and S3.

$$\frac{k2}{k1} = \frac{-\zeta + d/e}{\zeta + d2/e - d/e} \quad (25)$$

$$\frac{k2}{k3} = \left(1 - \frac{e}{e2}\right)\frac{\zeta e - d}{d2} \quad (26)$$

If the transverse distance e of the third suspension point S3 from the y coordinate axis, the transverse distance e2 of the drive shaft axis 20 from the y coordinate axis, the longitudinal distance d of the second and third suspension points S2 and S3 from the x coordinate axis, the longitudinal distance d2 of the second suspension point S2 from the x coordinate axis, and the rigidities k1, k2 and k3 of the respective suspension points S1, S2 and S3 are selected to satisfy Equations (25) and (26), the rolling motion of the final drive unit caused by the cardan shaft moment (M) around the drive shaft axis 20 and the pitching motion of the final drive unit caused by the starting moment ($\zeta M$) around the axle shaft axis 28 will be canceled on the drive shaft axis 20. Because of this, the drive shaft 18 is held in its horizontal position and no change occurs in the angle between the drive shaft 18 and the cardan shaft 32. This minimizes the vibrations and noises which may occur at the cardan joint 30. In this case, Equations (25) and (26) hold, for example, when $e2/e = \frac{1}{2}$, $d2/e = \frac{2}{3}$, $d/e = 13/3$ and $k1:k2:k3 = 1:1:2$. It is to be noted that Equations (25) and (26) hold when e1<0.

Equations (25) and (26) hold approximately and substantially no change occurs in the angle of the drive shaft 18 with respect to the cardan shaft 32 as long as the rigidities k1 and k2 at the first and second suspension points S1 and S2 are smaller than the rigidity k3 at the third suspension point S3 when the first suspension point S1 is located in front of the axis 28 of the axle shafts 24 and 26, when the second suspension point S2 is located in front of the axle shaft axis 28, when third suspension point S3 is located behind the axle shaft axis 28, and when the first and second suspension points S1 and S2 are located on one side of the drive shaft axis 20 and the third suspension point S3 and the bevel wheel 16 are located on the other side of the drive shaft axis 20.

If the first, second and third suspension points S1, S2 and S3 are located in a common plane including the drive shaft axis 20, the conditions set for the positions of the first, second and third suspension points S1, S2 and S3 will become closer to the conditions for which Equations (25) and (26) hold so as to further reduce the change in the angle of the drive shaft 18 with respect to the cardan shaft 32. It is to be noted, however, that the change in the angle of the drive shaft 18 with respect to the cardan shaft 32 is much smaller than in the conventional suspension structures even though the suspension points S1, S2 and S3 do not lie in a common plane containing the drive shaft axis 20 as long as Equations (25) and (26) hold approximately.

An additional suspension point may be provided along with the first, second and third suspension points S1, S2 and S3 to suspend the axle gear casing 10. In this case, Equations (25) and (26) hold approximately when the rigidity at the additional suspension point is smaller than the rigidities k1, k2 and k3 of the respective suspension points S1, S2 and S3.

What is claimed is:

1. A final drive suspension system for a vehicle comprising:

an axle shaft having driving wheels secured thereon, the axle shaft having an axis extending transversely of the vehicle;

a cardan shaft;

a final drive having a drive shaft having an axis extending longitudinally of the vehicle, the drive shaft being drivingly coupled to the cardan shaft, a bevel pinion integral with the drive shaft, a bevel wheel provided to the rear of the bevel pinion, the bevel wheel meshing with the bevel pinion, the bevel wheel being drivingly coupled to the axle shaft for transmitting a drive from the cardan shaft to the driving wheels; and elastic suspension means for elastically flexibly suspending the final drive at first, second and third suspension points with respect to the vehicle, the first suspension point being located in front of the axle shaft axis, the third suspension point being located behind the axle shaft axis, the second suspension point being located on one side of the drive shaft axis, the third suspension point and the bevel wheel being located on the other side of the drive shaft axis, the final drive having a reduction ratio of $\zeta$, the first suspension point being located a transverse distance of e1 from the second suspension point, the drive shaft axis being located a transverse distance of e2 from the second suspension point, the third suspension point being located a transverse distance of e from the second suspension point, the third suspension point being located a longitudinal distance of d from the first suspension point, the first suspension point being located a longitudinal distance of d2 from the second suspension point, the elastic suspension means having rigidities k1, k2 and k3 at the first, second and third suspension points, respectively, the rigidities k1, k2 and k3 being determined by $$\frac{k2}{k1} = \left(1 - \frac{e1}{e2}\right)\frac{-\zeta + \zeta e1/e + d/e}{\zeta + d2/e - d/e}$$

$$\frac{k2}{k3} = \left(1 - \frac{e}{e2}\right)\frac{\zeta - \zeta e1/e - d/e}{\zeta e1/e + d2/e}$$

2. The final drive suspension system as claimed in claim 1, wherein the first, second and third suspension points lie in a common plane including the drive shaft axis.

3. A final drive suspension system for a vehicle comprising:

an axle shaft having driving wheels secured thereon, the axle shaft having an axis extending transversely of the vehicle;

a cardan shaft;

a final drive including a drive shaft having an axis extending longitudinally of the vehicle, the drive shaft being drivingly coupled to the cardan shaft, a bevel pinion formed integral with the drive shaft, a bevel wheel provided behind and meshing with the bevel pinion and being drivingly coupled to the axle shaft for transmitting a drive from the cardan shaft to the driving wheels; and elastic suspension means for elastically flexibly suspending the final drive at first, second, and third suspension points with respect to the vehicle, the first suspension point being located in front of the axle shaft axis, the second and third suspension points being located behind the axle shaft axis, the first and second suspension points being located on one side of the drive shaft axis, the third suspension point and the bevel wheel being located on the other side of the drive shaft axis, the elastic suspension means having rigidities k1, k2, and k3 at the first, second, and third, suspension points, respectively, the rigidity k2 at the second suspension point being less than the rigidities k1 and k3 at the first and third suspension points, wherein the final drive has a reduction ration of $\zeta$, the first suspension point is located a transverse distance of e1 from the second suspension point, the drive shaft axis is located a transverse distance of e2 from the second suspension point, the third suspension point is located a transverse distance of e from the second suspension point, the third suspension point is located a longitudinal distance of d from the first suspension point, the first suspension point is located a longitudinal distance of d2 from the second suspension point, and the rigidities k1, k2 and k3 are determined by $$\frac{k2}{k1} = \left(1 - \frac{e1}{e2}\right)\frac{-\zeta + \zeta e1/e + d/e}{\zeta + d2/e - d/e}$$

$$\frac{k2}{k3} = \left(1 - \frac{e}{e2}\right)\frac{-\zeta + \zeta e1/e - d/e}{\zeta + e1/e - d2/e}$$

4. The final drive suspension system as claimed in claim 3, wherein the first, second and third suspension points lie in a common plane including the drive shaft axis.

5. A final drive suspension system for a vehicle comprising:

an axle shaft having driving wheels secured thereon, the axle shaft having an axis extending transversely of the vehicle;

a cardan shaft;

a final drive having a drive shaft having an axis extending longitudinally of the vehicle, the drive shaft being drivingly coupled to the cardan shaft, a bevel pinion integral with the drive shaft, a bevel wheel provided to the rear of the bevel pinion, the bevel wheel meshing with the bevel pinion, the bevel wheel being drivingly coupled to the axle shaft for transmitting a drive from the cardan shaft to the driving wheels; and elastic suspension means for elastically flexibly suspending the final drive at first, second and third suspension points with respect to the vehicle, the first and second suspension points being located in front of the axle shaft axis, the third suspension point being located behind the axle shaft axis, the second suspension point being located on one side of the drive shaft axis, the first and third suspension points and the bevel wheel being located on the other side of the drive shaft axis, the elastic suspension means having rigidities k1, k2 and k3 at the first, second and third suspension points, respectively, the rigidity k1 at the first suspension point being less than the rigidities k2 and k3 at the second and third suspension points.

6. The final drive suspension system as claimed in claim 5, wherein the final drive has a reduction ration of $\zeta$, the first suspension point is located a transverse distance of e1 from the second suspension point, the drive shaft axis is located a transverse distance of e2 from the second suspension point, the third suspension point is located a transverse distance of e from the second suspension point, the third suspension point is located a longitudinal distance of d from the first suspension point, the first suspension point is located a longitudinal distance of d2 from the second suspension point, and the rigidities k1, k2 and k3 are determined by $$\frac{k2}{k1} = \left(1 - \frac{e1}{e2}\right)\frac{-\zeta + \zeta e1/e + d/e}{\zeta + d2/e - d/e}$$

$$\frac{k2}{k3} = \left(1 - \frac{e}{e2}\right)\frac{-\zeta + \zeta e1/e - d/e}{\zeta + e1/e - d2/e}$$

7. The final drive suspension system as claimed in claim 6, wherein the first, second and third suspension points lie in a common plane including the drive shaft axis.

8. The final drive suspension system as claimed in claim 5, wherein the first, second and third suspension points lie in a common plane including the drive shaft axis.

9. A final drive suspension system for a vehicle comprising:

an axle shaft having driving wheels secured thereon, the axle shaft having an axis extending transversely of the vehicle;

a cardan shaft;

a final drive having a drive shaft having an axis extending longitudinally of the vehicle, the drive shaft being drivingly coupled to the cardan shaft, a bevel pinion integral with the drive shaft, a bevel wheel provided in rear of the bevel pinion, the bevel wheel meshing with the bevel pinion, the bevel wheel being drivingly coupled to the axle shaft for transmitting a drive from the cardan shaft to the driving wheels; and elastic suspension means for elastically flexibly suspending the final drive at first, second and third suspension points with respect to the vehicle, the first and second suspension points being located in front of the axle shaft axis, the third suspension point being located behind the axle shaft axis, the first and second suspension points being located on one side of the drive shaft axis, the third suspension point and the bevel wheel being located on the other side of the drive shaft axis, the first suspension point being located a transverse distance of zero from the second suspension point, the elastic suspension means having rigidities k1, k2 and k3 at the first, second and third suspension points, respectively, the rigidities k1 and k2 at the first and second suspenion points being less than the rigidity k3 at the third suspension point.

10. The final drive suspension system as claimed in claim 9, wherein the final drive has a reduction ration of $\zeta$, the first suspension point is located a transverse distance of e1 from the second suspension point, the drive shaft axis is located a transverse distance of e2 from the second suspension point, the third suspension point is located a transverse direction of e from the second suspension point, the third suspension point is located a longitudinal distance of d from the first suspension point, the first suspension point is located a longitudinal distance of d2 from the second suspension point, and the rigidities k1, k2 and k3 are determined by $$\frac{k2}{k1} = \left(1 - \frac{e1}{e2}\right) \frac{-\zeta + \zeta e1/e + d/e}{\zeta + d2/e - d/e}$$

$$\frac{k2}{k3} = \left(1 - \frac{e}{e2}\right) \frac{-\zeta + \zeta e1/e - d/e}{\zeta + e1/e - d2/e}$$

11. The final drive suspension system as claimed in claim 10, wherein the first, second and third suspension points lie in a common plane including the drive shaft axis.

12. The final drive suspension system as claimed in claim 9, wherein the first, second and third suspension points lie in a common plane including the drive shaft axis.

* * * * *